July 22, 1930.  W. W. KEMP ET AL  1,771,223
AIR AND GAS MIXING DEVICE
Filed Jan. 14, 1927   5 Sheets-Sheet 4

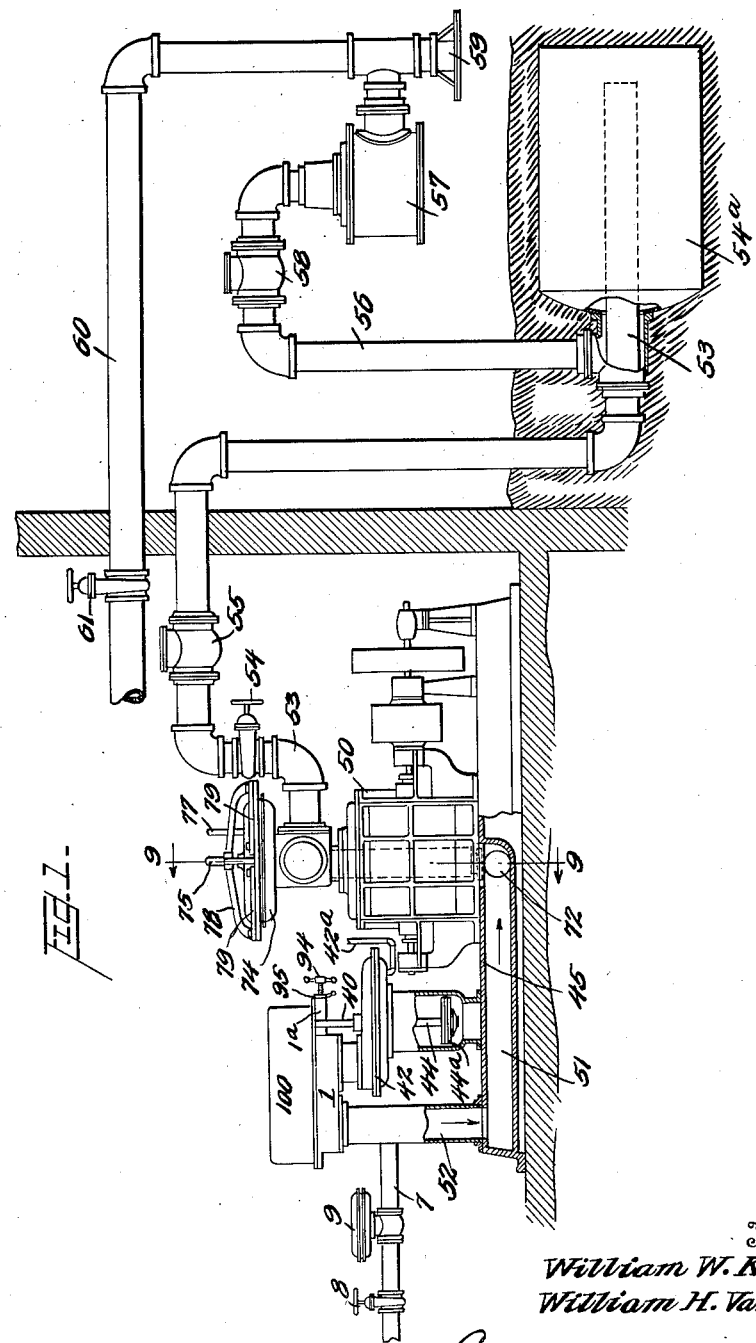

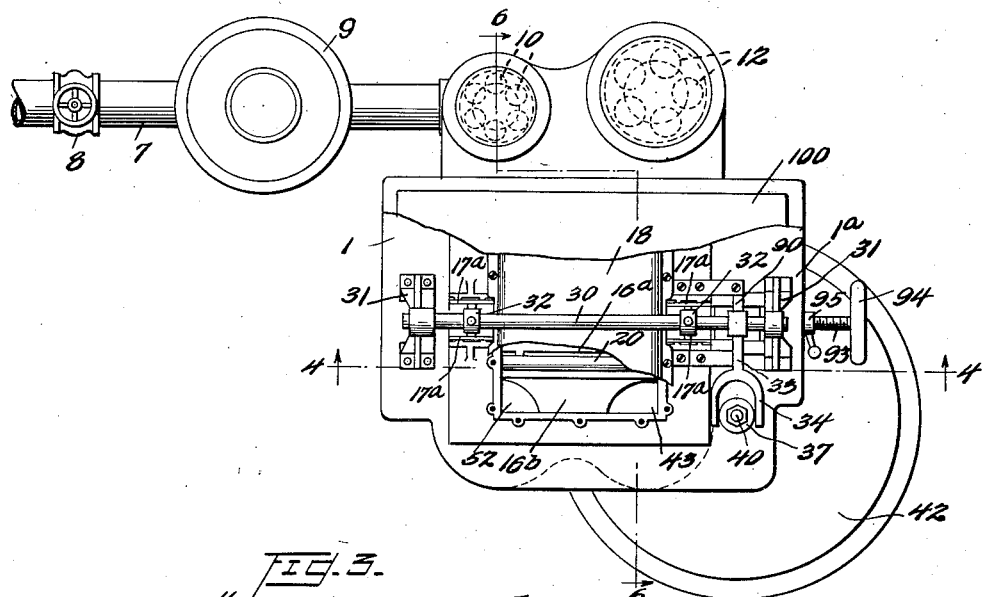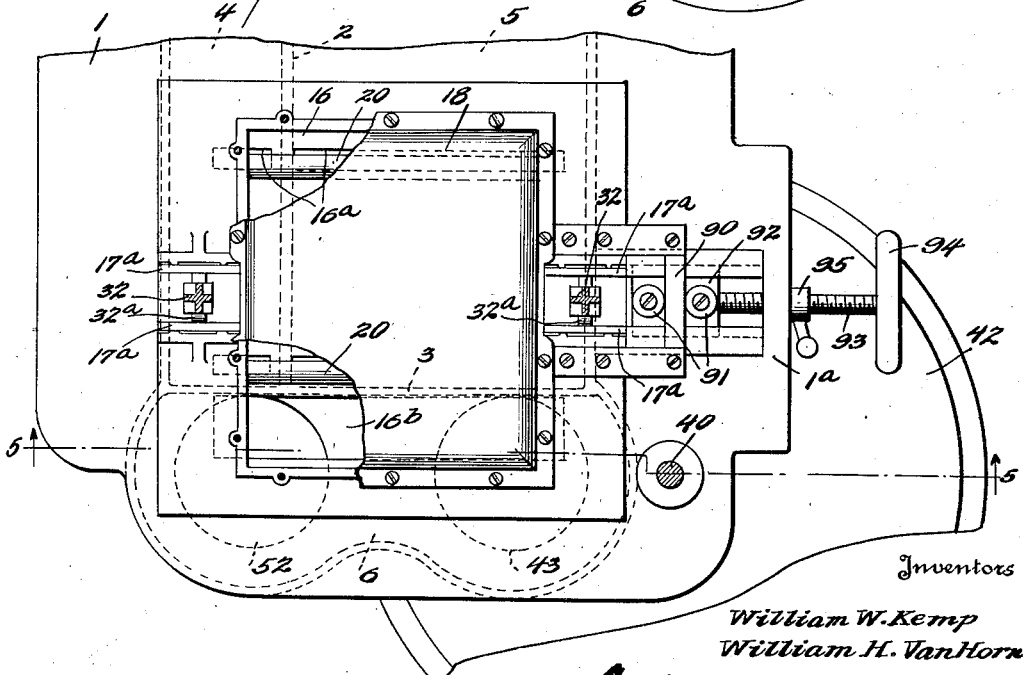

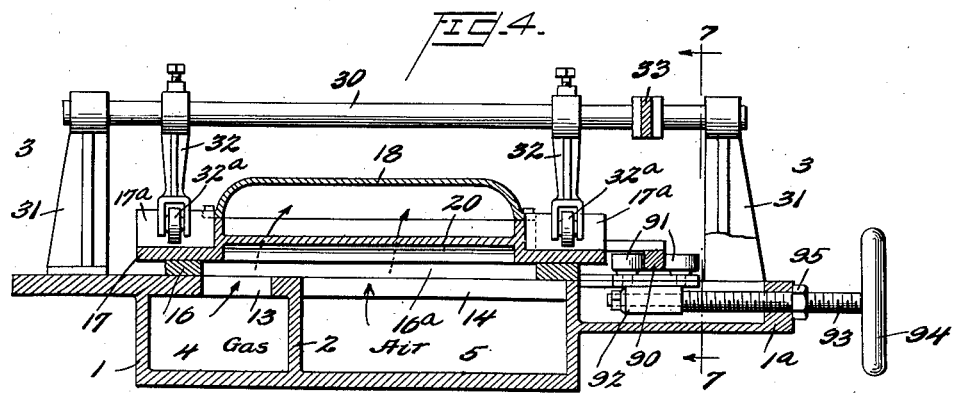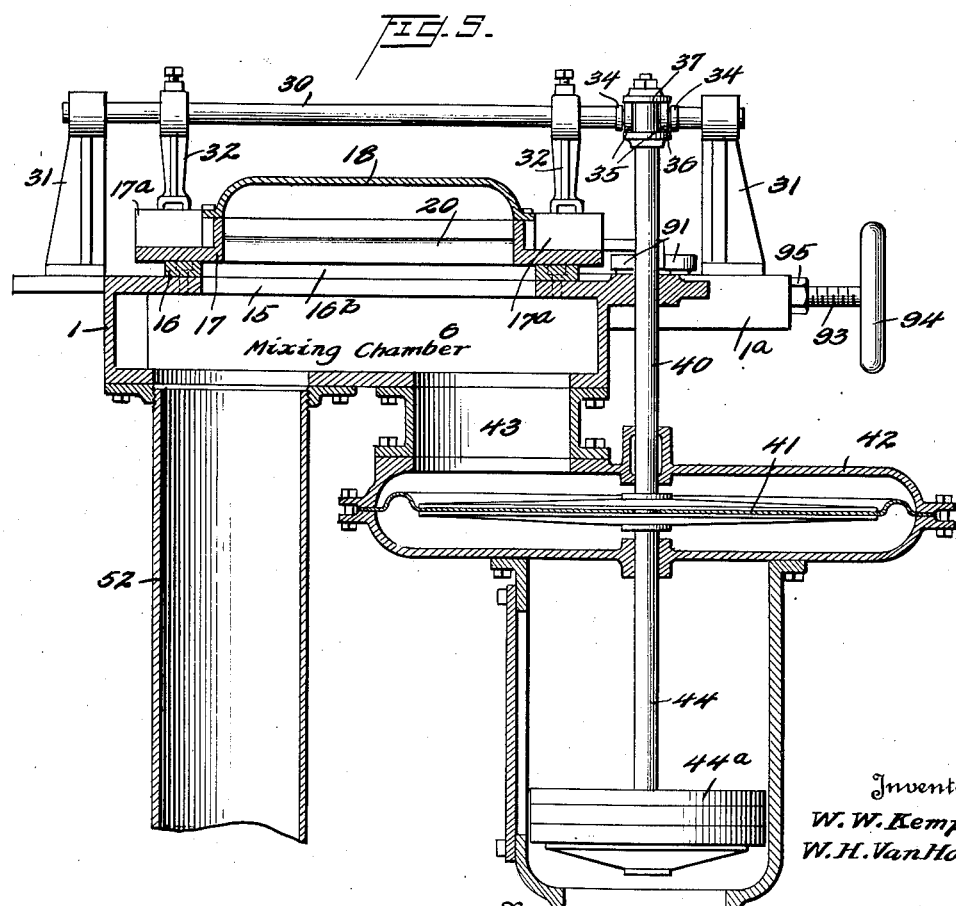

Inventors
William W. Kemp
William H. Van Horn
By Cushman Bryant & Darby
Attorneys July 22, 1930.  W. W. KEMP ET AL  1,771,223
AIR AND GAS MIXING DEVICE
Filed Jan. 14, 1927  5 Sheets-Sheet 5
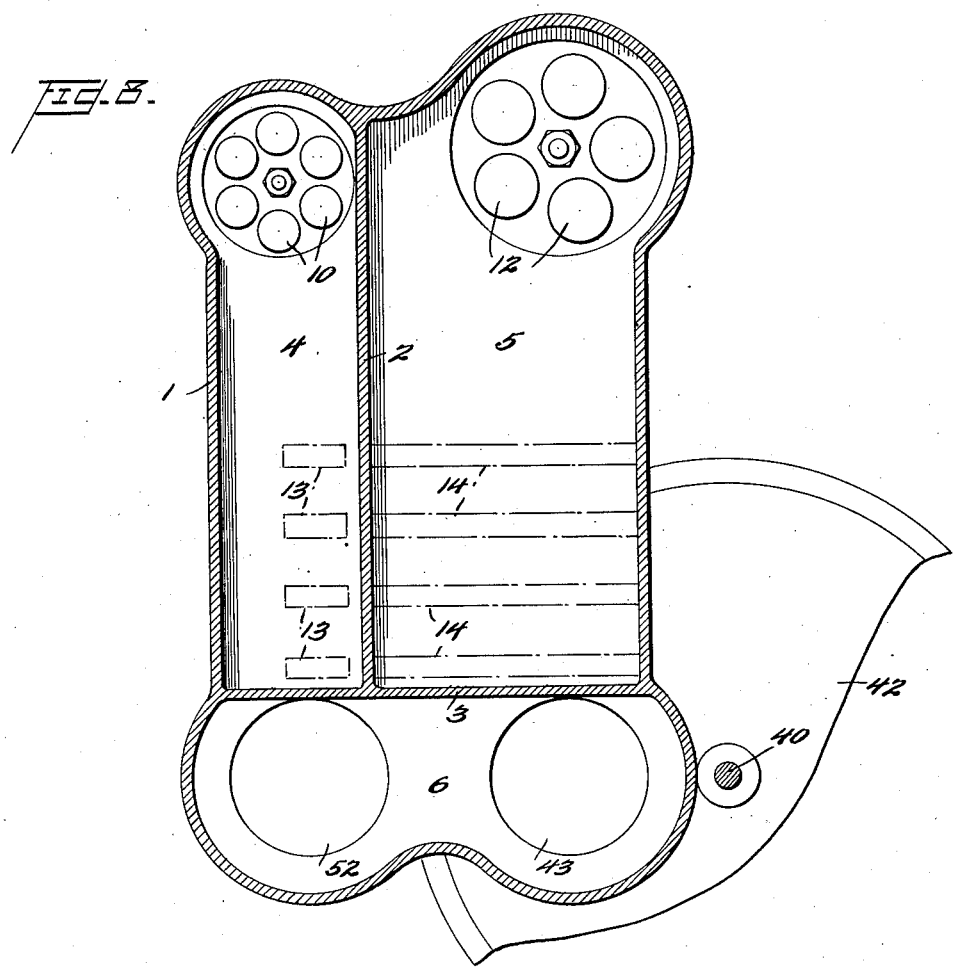
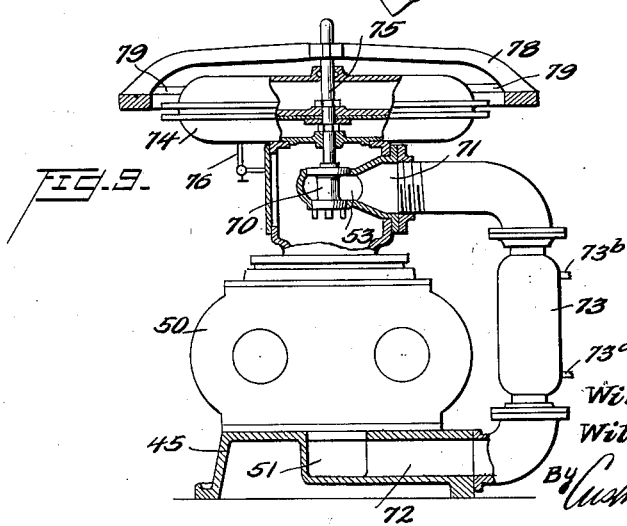
Inventors
William W. Kemp
William H. Van Horn Patented July 22, 1930

1,771,223

UNITED STATES PATENT OFFICE

WILLIAM WALLACE KEMP AND WILLIAM H. VAN HORN, OF BALTIMORE, MARYLAND, ASSIGNORS TO THE C. M. KEMP MANUFACTURING COMPANY, OF BALTIMORE, MARYLAND, A CORPORATION OF MARYLAND

AIR AND GAS MIXING DEVICE

Application filed January 14, 1927. Serial No. 161,157.

The present invention relates to improvements in air and gas mixing devices, being particularly designed for producing a combustible gas for use in industrial plants from a mixture of gas, such as commonly furnished for illuminating purposes in cities, and air.

As will be appreciated, it is very important in such apparatus that the supply of gas be sufficient to meet varying conditions of use, and that the quality, or relative proportions of air and gas, of the mixture be maintained definite, regardless of variations in the consumption thereof. The number of burners in use at any time will necessarily vary, and it is important that the production or supply of gas be adequate to maintain the maximum number of burners in use and a flame of any desired intensity at each of said burners.

Various forms of apparatus designed for this purpose have been heretofore proposed, but the present improvements are designed to overcome certain objections which experience has shown to be incident to the arrangements previously suggested or employed and by which a suitable quantity of gaseous mixture, in which the proportions of air and gas are definitely predetermined, will be furnished at all times, the mechanism including means whereby the volume of gas delivered from the apparatus will be varied in accordance with the number of burners, for example, in use at any particular time, and also including means by which, when desired, the proportions of air and gas in the mixture may be varied.

With the foregoing and other ends in view, the present invention resides in the construction and arrangement of parts that will be hereinafter more particularly described, reference being had to the accompanying drawings.

It will be understood, of course, that the drawings are intended to be illustrative rather than restrictive of the invention, and that some of the parts illustrated are shown more or less conventionally. Except where especially noted in the appended claims, the invention is not to be understood as being limited to the exact details shown, although the drawings illustrate an embodiment of the invention which has by actual test been found to operate satisfactorily and presents a design which is at present preferred.

In the drawings

Figure 1 is a more or less diagrammatic elevation of an embodiment of the present invention.

Figure 2 is a plan, on an enlarged scale, of the mixing devices, a portion of the top being broken away.

Figure 3 is a similar view on a still larger scale, substantially on the line 3—3 of Figure 4.

Figure 4 is a vertical section substantially on the line 4—4 of Figure 2, the outer cover being removed.

Figure 5 is a vertical section substantially on the line 5—5 of Figure 3.

Figure 6 is a vertical section substantially on the line 6—6 of Figure 2.

Figure 7 is a detail substantially on the line 7—7 of Figure 4.

Figure 8 is a plan, or horizontal section, through the casing including the mixing chamber, substantially on the line 8—8 of Figure 6.

Figure 9 is a transverse vertical section substantially on the line 9—9 of Figure 1.

Referring to the drawings in the several figures of which like reference characters designate corresponding parts.

1 designates a main body or casing which is interiorly divided by vertical partition or division walls 2, 3, to provide independent gas and air passages 4, 5 and a mixing chamber or compartment 6.

7 designates a gas supply pipe, which may be, for example, a branch from a city main which communicates with the gas passage 4 in the mixing chamber casing. As shown, a cut-off valve 8 is provided in the gas supply pipe and between this valve and the mixing chamber is arranged a suitable gas regulator 9 which is adapted to reduce the gas pressure from the usual pressure at which illuminating gas is commonly supplied.

Suitable check valves are provided in the inlets to the gas and air passages 4, 5, so that the gas and air are both supplied to the mixing chamber, and compressor hereinafter referred to, at less than atmospheric pressure.

Preferably the gas inlet is provided with a plurality of check valves 10 rather than with a single valve. In the embodiment of the invention illustrated, there are six of these gas inlet check valves, each comprising a suitable head and a depending stem 10ª which is freely movable through a guide 11. The gas inlet check valves 10, referred to, are of different weights, the several valves opening successively as the suction through the gas passage 4 is increased. When only a relatively small amount of gas is required, the lightest of the valves 10 will be lifted from its seat, the others remaining closed.

As the demand for gas from the main 7 increases, the check valves 10 will be raised in succession according to their weights to admit the desired quantity of gas to the passage 4.

As shown, a plurality of check valves 12 are also provided in the air inlet. Preferably, however, these are all of the same weight. Experience has shown that a plurality of relatively small valves of the form shown are more readily maintained in effective working condition than a single large valve.

A series of ports or rectangular shaped apertures 13 are provided in the top wall of the gas passage 4, and a similar series of slots 14 are provided in the top of the air passage 5. A passage 15 is provided in the top of the mixing chamber 6, which chamber extends throughout the width of the air and gas passages, as shown.

Secured on the outer face of the top of the air and gas passages is a plate 16 having ports 16ª which communicate with the aligned ports 13, 14, in the tops of the gas and air passages 4, 5; and an elongated port 16ᵇ which aligns with the aforesaid port 15 in the top of the mixing chamber 6.

On the plate 16 is mounted a chambered slide valve consisting of a base frame 17 and a domed cover or upper member 18. The slide valve is interiorly provided with a series of transversely extending bars 20 which cooperate with the ports 16ª of the plate 16 to vary the extent of opening of the air and gas supply ports 14, 13.

When the machine is operating the slide valve is automatically reciprocated so that the amount of air and gas supplied to the mixing chamber and to the compressor, hereinafter referred to, will be properly proportioned to the amount that is being consumed at any particular time. It will be seen that this movement of the slide valve will always furnish a definitely proportioned mixture of air and gas to the mixing chamber 6.

Means are provided whereby, when desired, the relative proportions of air and gas in the mixture may be varied at any time according to the necessities of the use to which the mixture is being put, or the desires of the operator.

The means for automatically reciprocating the slide valve, as shown, include a rock shaft 30 which is mounted in suitable bearings 31 rising from the main casing of the mixing apparatus. Arms 32 are adjustably secured on the rock shaft, and in the free, bifurcated end of each of said arms is supported a roll 32ª. The rollers at the ends of the arms 32 extend into guides 17ª that project from opposite sides of the slide valve 17. An arm 33 is connected to the rock shaft 30 at one side of the slide valve and the free end of this arm is engaged with a rod 40 which is connected to a diaphragm 41 mounted in a suitable casing 42, which through a duct 43 communicates with the mixing chamber 6.

Depending from the diaphragm 41 is a weight support 44 on which are mounted a suitable number of weight disks 44ª. As shown, the diaphragm casing 42 is at the upper end of a hollow pedestal which encloses the weight disks 44ª and rests upon the base or bed plate 45 of the apparatus.

The connection between the rock shaft arm 33 and the diaphragm actuated rod or link 40 is shown as being formed by providing the rock shaft arm with a fork 34 at its outer end and mounting on each member of said fork an anti-friction roller 35, which rollers extend between abutments 36, 37 on the rod or link 40.

The diaphragm casing 42 is provided with an atmospheric vent 42ª (Fig. 1) which communicates with said casing below the diaphragm 41 therein.

Mounted on the base plate 45 at one side of the mixing devices, before referred to, is a suitable rotary compressor 50. This, specifically, may be of any desired type, and as shown, the inlet thereof is connected by a passage or duct 51, formed in the base 45, with the mixing chamber 6 through the interior of the pedestal-like mounting 52 for the casing containing the air and gas supply passages and the mixing chamber, before described.

The compressor outlet communicates with a discharge pipe 53, a suitable diaphragm actuated and adjustably weighted by-pass valve being provided for controlling the flow of mixture from the compressor to said pipe which will be hereinafter described more in detail.

A gate or cut-off valve 54 is provided in the discharge pipe 53, and also a suitable check valve is located in a casing 55 preventing return of mixture from the service pipes to the compressor. Beyond the check valve casing 55, the pipe 53 extends into an expansion chamber 54ª. As shown, this chamber is preferably located outside of the building in which the apparatus is arranged, the pipe 53 extending through a wall of such building.

From the expansion chamber or tank 54a, the mixture passes to a pipe 56 which communicates with a casing 57 containing means for arresting "back fire," a suitable check valve being preferably interposed as at 58.

The casing 57 of the back fire arrester communicates with the service pipe 60 and preferably a "soft head" 59 is provided to avoid damage to the apparatus or its connection with the main in the event of an explosion in the pipes, due to back firing.

The service pipe 60 is shown as extending through the wall of the building and as being provided with a main cut-off valve 61. As usual, it is to be connected with any suitable number of burners (not shown) by suitable branch pipes and connecting fittings.

As before stated, the flow of mixture from the compressor to the discharge pipe 53 is controlled by a valve 70. This, as shown in detail in Fig. 9, is a double seated valve and is mounted in the connection between the compressor outlet and the discharge pipe 53 which also includes a laterally extending by-pass 71. This by-pass communicates with the compressor inlet through a duct 72 formed in the base 45 of the apparatus, and, as is customary, a portion of such by-pass is surrounded by a cooling jacket 73 having inlet and outlet connections for cooling water at 73a, 73b.

Above the outlet chamber of the compressor is supported a diaphragm casing 74, the diaphragm in which is connected to the stem 75 of the valve 70.

A valve controlled conduit 76 maintains the chamber in the casing 74 below the diaphragm in communication with the compressor outlet chamber, and a vent 77 leads from the chamber of diaphragm casing 74 above the diaphragm therein to the atmosphere.

Means are provided for varying the resistance to opening of the valve 70, in accordance with variations in the demand for gas from the service pipe 60. As shown, a spider-like weight carrier 78 is supported on the valve stem 75, and detachable weights of ring-like form 79 are secured to said carrier as desired.

Movement of the slide valve due to vibration of the diaphragm 41 will automatically vary the volume of gas and air supplied to the mixing chamber. Means are also provided whereby the relative proportions of air and gas supplied to the mixing chamber at any time may be varied.

Such means are manually controlled. As shown, the slide valve is provided with a lateral extension including a cross bar 90 which extends between two guide rolls 91 mounted on a block 92 attached to a threaded rod 93 which is mounted in a suitable bearing in an extension 1a from the frame 1. At its outer end the threaded rod 93 is provided with a hand wheel 94 by means of which it may be turned, and through contact of the rolls 91 with the cross bar 90 of the slide valve, the latter will be bodily adjusted in the direction of the length of the rock shaft 30 and transversely of the air and gas supply passages. The effect of such movement of the slide valve will vary the maximum effective area of the gas ports 13 and air ports 14. As represented in Figure 3, these ports are longer than the bars 20 of the slide valve, and therefore as the valve is adjusted to the left, for example in Fig. 3, the maximum effective area of the gas ports will be increased and the maximum effective area of the air ports decreased so that under such adjustment a richer mixture will be supplied to the compressor than if the parts are positioned as shown in Figs. 2 and 3.

An adjustable nut 95 is provided for retaining the valve shifting screw in any adjusted position.

Preferably the slide valve and the rock shaft and associated parts for moving the same are all enclosed within a suitable cover 100 arranged on top of the mixing apparatus casing. The operation of the improved apparatus may be briefly described as follows.

By the action of the gas regulator 9 the pressure of gas is preliminarily reduced from the usual pressure of supply mains, such as will balance a 3" water column to a pressure of about 1" to 1½" water column. The lightest of the multiple disk check valves 10 positioned between the gas regulator and the slide valve is sufficiently heavy to remain closed against such 1" to 1½" water column gas pressure. The check valves 10, 12 are opened by the suction of the compressor, the inlet of which it will be noted is directly connected with the mixing chamber through the ducts 51, 52.

The compressor 50 is of a capacity in excess of the greatest volume of mixture which is ever to be required from the apparatus, so that there is a constant circulation of mixture from the compressor outlet through the by-pass to the compressor inlet. In other words, whenever the apparatus is in use, the by-pass valve is open and a certain volume of mixture is circulating.

As the consumption of gas from the service pipe 60 varies, the force of suction exerted by the compressor on the mixing chamber will effect automatic movement of the slide valve to properly maintain the desired volume of air and gas supplied to that chamber, but the proportions of the mixture will not be varied.

By means of the manually adjustable threaded shaft 93 the slide valve may be bodily adjusted to vary the proportions of air and gas in the mixture as desired.

Experience with apparatus constructed as herein described and illustrated has shown that the invention provides a very efficient means for mixing air and gas, and accurately delivering an exact volume thereof at any time according to the requirements, for example, the number of burners which are in use.

One of the features to which importance is attached is that the automatic movement of the slide valve is controlled directly by the suction of the compressor, the actuating diaphragm being located between the mixing apparatus and the inlet to the compressor and exposed to the suction in the mixing chamber, as distinguished from adjusting such valve by variation of the pressure in the discharge pipe.

Having thus described the invention, what we claim is:

1. In an air and gas mixing apparatus, the combination of a casing providing a mixing chamber and independent passages for supplying air and gas to said chamber, a valve plate having a port communicating with the mixing chamber and other ports communicating, respectively, with each of said passages, a chambered slide valve abutting said plate and provided with ports corresponding to those in the valve plate, a compressor having its inlet communicating with the mixing chamber, a diaphragm within a chamber between the mixing chamber and the compressor and exposed to the suction of the compressor, connections between said diaphragm and the slide valve for bodily moving the latter on the valve plate to vary the extent of opening of the ports of both the air and gas passages to vary the volume of air and gas supplied to the mixing chamber in accordance with variations in the suction of the compressor, and manually adjustable means for shifting the slide valve relative to the valve plate to vary the effective areas of both the air and gas ports to control the proportions of air and gas supplied to the mixing chamber.

2. In an air and gas mixing apparatus, the combination of a casing providing a mixing chamber and independent passages for supplying air and gas to said chamber, a valve plate having a port communicating with the mixing chamber and other ports communicating, respectively, with each of said passages, a chambered slide valve bearing against said plate and provided with ports corresponding to those in the valve plate, a compressor having its inlet communicating with the mixing chamber, a diaphragm within a chamber between the mixing chamber and the compressor and exposed to the suction of the compressor, a rock shaft, arms projecting from said shaft and engaging the valve to vary the extent of opening of the ports of both the air and gas passages at each actuation of the shaft, an arm on said shaft connected with the diaphragm, whereby the shaft will be actuated in accordance with variations in the suction of the compressor, and manually adjustable means for bodily shifting the valve relative to the rock shaft and said plate, for the purpose described.

3. In an air and gas mixing apparatus, the combination of a casing providing a mixing chamber and independent passages for supplying air and gas to said chamber, a valve plate having a port communicating with the mixing chamber and other ports communicating, respectively, with each of said passages, a chambered slide valve provided with ports corresponding to those in the valve plate, a compressor having its inlet communicating with the mixing chamber, a diaphragm within a chamber between the mixing chamber and compressor and exposed to the suction of the compressor, a rock shaft extending transversely across the air and gas passages and connected with the diaphragm, arms projecting from said shaft and extending into guides on the slide valve, whereby the valve will be adjusted on the valve plate to vary the extent of opening of both the air and gas ports at each movement of the shaft, and manually adjustable means for moving the valve longitudinally of the shaft without affecting its connection therewith, to vary the effective areas of both the air and gas ports.

4. In an air and gas mixing apparatus, the combination of a casing interiorly divided into a mixing chamber and two parallel passages, provided with air and gas inlets, respectively, check valves controlling flow into said passages through said inlets, a plate positioned across said chamber and passages and having a port communicating with said chamber and two other ports, communicating, respectively, with the air passage and the gas passage, a chambered valve bearing on said plate and provided with ports corresponding to the aforesaid ports in said plate, a compressor having its inlet communicating with the mixing chamber, means controlled by variations in the suction of the compressor for adjusting the slide valve to vary the extent of opening of the air and gas ports, and manually adjustable means for adjusting the valve relative to the plate to vary the effective area of said ports.

5. In an air and gas mixing apparatus, the combination of a casing including a mixing chamber and means for admitting air and gas thereto, a compressor having its inlet connected with the mixing chamber, a discharge pipe connected with the outlet of the compressor, a by-pass connecting the discharge pipe and inlet of the compressor, and an automatically acting valve controlling flow from the compressor through the discharge pipe and the by-pass.

6. In an air and gas mixing apparatus, the combination of a casing including a mixing chamber and a compressor having its inlet connected with the mixing chamber, a discharge pipe connected with the outlet of the compressor, a by-pass connecting the discharge pipe and inlet of the compressor, a valve controlling flow from the compressor through the discharge pipe and the by-pass, and a weight detachably connected to said valve to vary the resistance thereof.

7. In an air and gas mixing apparatus, the combination of a casing including a mixing chamber and a compressor having its inlet connected with the mixing chamber, a discharge pipe connected with the outlet of the compressor, a by-pass connecting the discharge pipe and compressor inlet, a valve controlling flow from the compressor to both the discharge pipe and by-pass, a diaphragm connected to the stem of said valve and exposed to atmospheric pressure, a weight carrier attached to the valve stem, and a weight detachably connected to said carrier.

8. In an air and gas mixing apparatus, the combination of a casing interiorly divided into a mixing chamber and independent air and gas supply passages, a plate extending across said passages and having formed therein two parallel series of ports, those of one series communicating with the air passage and those of the other series communicating with the gas passage, a chambered valve bearing on the plate and in communication with the mixing chamber, said valve having in its face abutting the plate two series of ports respectively corresponding to the aforesaid gas and air supply ports in said plate, a compressor having its inlet connected with the mixing chamber, automatic means arranged between the mixing chamber and the compressor and controlled by action of the compressor for moving the valve to vary the extent of opening of both the air and gas ports, and manually adjustable means for bodily adjusting the valve relative to the plate in a direction substantially at right angles to the direction of said automatic movement to vary the effective areas of both the air and gas ports.

9. In an air and gas mixing apparatus, the combination of a mixing chamber, means for supplying air and gas to said chamber, a compressor having its inlet connected with the mixing chamber, a discharge pipe connected with the compressor outlet, a by-pass connecting the discharge pipe and compressor inlet, the capacity of the compressor exceeding that of the discharge pipe whereby when the apparatus is operating there will be a continuous flow through the by-pass, a valve controlling flow of air and gas to the mixing chamber, and means for actuating said valve connected with the suction side of the compressor.

10. In an air and gas mixing apparatus, the combination of a mixing chamber, a compressor having its inlet connected with the mixing chamber, a discharge pipe connected with the compressor outlet, a by-pass connecting the discharge pipe with the compressor inlet, a valve controlling flow from the compressor to the discharge pipe and by-pass, and means for varying the weight of the last said valve.

11. In an air and gas mixing apparatus, the combination of a mixing chamber, independent ducts for supplying air and gas to said chamber, means for connecting the gas supply duct with a gas main including a regulator for reducing the pressure of gas flowing from the main to said passage, a plurality of check valves of different weights in the inlet to the gas passage, a compressor having its inlet connected with the mixing chamber, a discharge pipe connected with the compressor outlet, a valve controlling the supply of gas and air to the mixing chamber, a diaphragm exposed to the suction of the compressor, and means connecting the diaphragm and said valve.

12. In an air and gas mixing apparatus, the combination of a mixing chamber having independent inlets for air and gas, a compressor having its inlet communicating with the mixing chamber, a delivery pipe communicating with the compressor outlet, means regulating the proportions of air and gas admitted to the mixing chamber including a diaphragm exposed to the action of the compressor through the mixing chamber, and means including a diaphragm exposed to the pressure in the delivery pipe for varying the volume of mixture passing through such pipe.

13. In an air and gas mixing apparatus, the combination of a casing providing a mixing chamber and independent air and gas inlets, a valve plate having a port communicating with the mixing chamber and other ports communicating, respectively, with each of the said inlets, a chambered slide valve provided with ports corresponding with the air and gas inlet ports in the valve plate, a compressor having its inlet communicating with a port in a wall of the mixing chamber, a diaphragm arranged in a chamber that communicates with a second port in the said wall of the mixing chamber, connections between said diaphragm and the slide valve for bodily moving the latter relative to the valve plate to vary the volume of air and gas supplied to the mixing chamber in accordance with variations in the suction of the compressor, and manually adjustable means for varying the normal relation between the valve and valve plate to change the proportions of air and gas supplied to the mixing chamber.

14. In an air and gas mixing apparatus, the combination of a casing providing a mixing chamber and independent air and gas inlets, a valve plate having a port communicating with the mixing chamber and other ports communicating, respectively, with each of the said inlets, a chambered slide valve provided with ports corresponding with the air and gas inlet ports in the valve plate, a compressor having its inlet communicating with a port in the bottom of the mixing chamber, a diaphragm chamber communicating with a second port in the bottom of the mixing chamber, a diaphragm in said diaphragm chamber, connections between said diaphragm and the slide valve for bodily moving the latter relative to the valve plate to vary the volume of air and gas supplied to the mixing chamber in accordance with variations in the suction of the compressor, and manually adjustable means for varying the normal relation between the valve and valve plate to change the proportions of air and gas supplied to the mixing chamber.

15. In an air and gas mixing apparatus the combination of a casing providing a mixing chamber and independent air and gas inlets, a valve plate having a port communicating with the mixing chamber and other ports communicating, respectively, with each of the said inlets, a chambered slide valve provided with ports corresponding with the air and gas inlet ports in the valve plate, a compressor having its inlet communicating with a port in a wall of the mixing chamber, a diaphragm arranged in a chamber that communicates with a second port in the said wall of the mixing chamber a rock shaft, connections between said shaft and the slide valve and between said shaft and diaphragm for moving the slide valve relative to the valve plate to vary the volume of air and gas supplied to the mixing chamber in accordance with variations in the suction of the compressor, and manually adjustable means for bodily moving the slide valve in the direction of the length of the rock shaft to change the proportions of air and gas supplied to the mixing chamber.

In testimony whereof we have hereunto set our hands.

WILLIAM WALLACE KEMP.
WILLIAM H. VAN HORN.